United States Patent
Beard et al.

(10) Patent No.: US 11,822,810 B2
(45) Date of Patent: Nov. 21, 2023

(54) REMOVABLE MEMORY DEVICE OF A NETWORK SWITCH FOR AN INFORMATION HANDLING SYSTEM

(71) Applicant: Dell Products L.P., Round Rock, TX (US)

(72) Inventors: Robert Neal Beard, Austin, TX (US); Colin John Montgomery, Mountain View, CA (US); Shree Ramakrishna Rathinasamy, Round Rock, TX (US); Padmanabhan Narayanan, Redmond, WA (US)

(73) Assignee: Dell Products L.P., Round Rock, TX (US)

( * ) Notice: Subject to any disclaimer, the term of this patent is extended or adjusted under 35 U.S.C. 154(b) by 158 days.

(21) Appl. No.: 17/452,158

(22) Filed: Oct. 25, 2021

(65) Prior Publication Data

US 2023/0126639 A1 Apr. 27, 2023

(51) Int. Cl.
*G06F 3/06* (2006.01)
*G06F 1/20* (2006.01)

(52) U.S. Cl.
CPC .............. *G06F 3/0655* (2013.01); *G06F 1/20* (2013.01); *G06F 3/0604* (2013.01); *G06F 3/0679* (2013.01)

(58) Field of Classification Search
CPC ........ G06F 3/0655; G06F 1/20; G06F 3/0604; G06F 3/0679; G06F 1/181; G06F 1/206; H05K 7/20727; H05K 7/20172; H05K 7/1488; H05K 7/20209; H05K 5/0065; H05K 5/0069; H05K 7/20136; F04D 25/166; G11B 33/142
See application file for complete search history.

(56) References Cited

U.S. PATENT DOCUMENTS

| | | | | |
|---|---|---|---|---|
| 6,795,314 | B1 * | 9/2004 | Arbogast | H05K 7/20172 165/122 |
| 7,305,316 | B2 * | 12/2007 | Frankel | H05K 7/20209 361/679.48 |
| 2002/0121555 | A1 * | 9/2002 | Cipolla | G06F 15/17381 236/49.1 |
| 2003/0234625 | A1 * | 12/2003 | Frankel | G06F 1/206 318/268 |
| 2007/0035923 | A1 * | 2/2007 | Beall | G06F 1/183 361/679.48 |
| 2008/0310967 | A1 * | 12/2008 | Franz | F04D 27/008 318/434 |

(Continued)

*Primary Examiner* — Michael A Matey
(74) *Attorney, Agent, or Firm* — McDermott Will & Emery LLP

(57) ABSTRACT

In one embodiment, a network switch for an information handling system includes: a central processing unit (CPU); and a fan module removably coupled to the network switch, the fan module including: a housing having a front end and a back end; a plurality of fans disposed within the housing proximate to the back end; a memory interface disposed within the housing proximate to the front end, the memory interface communicably coupled to the CPU; a memory device disposed within the housing proximate to the memory interface, the memory device storing information associated with the networking operations and communicably coupled to the memory interface, the memory device removably coupled to the fan module.

14 Claims, 4 Drawing Sheets

(56) References Cited

U.S. PATENT DOCUMENTS

| | | | | |
|---|---|---|---|---|
| 2012/0156063 | A1* | 6/2012 | Horng | F04D 29/582 |
| | | | | 415/203 |
| 2013/0064650 | A1* | 3/2013 | Wang | G06F 1/20 |
| | | | | 415/182.1 |
| 2014/0016268 | A1* | 1/2014 | Tsujimura | G06F 1/20 |
| | | | | 361/695 |
| 2016/0073521 | A1* | 3/2016 | Marcade | H05K 7/20727 |
| | | | | 361/679.02 |
| 2016/0073554 | A1* | 3/2016 | Marcade | G06F 1/183 |
| | | | | 211/26 |
| 2017/0086332 | A1* | 3/2017 | Jaskela | H05K 7/1487 |
| 2018/0020575 | A1* | 1/2018 | Zhang | B01D 46/4254 |
| 2018/0080480 | A1* | 3/2018 | Doglio | F04D 29/668 |
| 2019/0073006 | A1* | 3/2019 | Chang | G06F 1/26 |
| 2020/0011339 | A1* | 1/2020 | Li | F04D 27/004 |
| 2020/0333859 | A1* | 10/2020 | Nelson | G06F 1/20 |
| 2021/0270278 | A1* | 9/2021 | Gao | F04D 29/403 |

* cited by examiner

REMOVABLE MEMORY DEVICE OF A NETWORK SWITCH FOR AN INFORMATION HANDLING SYSTEM

BACKGROUND

Field of the Disclosure

The disclosure relates generally to information handling systems, and in particular to a removable memory device of a network switch for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed network switch for an information handling system includes: a central processing unit (CPU); and a fan module removably coupled to the network switch, the fan module including: a housing having a front end and a back end; a plurality of fans disposed within the housing proximate to the back end; a memory interface disposed within the housing proximate to the front end, the memory interface communicably coupled to the CPU; a memory device disposed within the housing proximate to the memory interface, the memory device storing information associated with the networking operations and communicably coupled to the memory interface, the memory device removably coupled to the fan module.

In one or more of the disclosed embodiments, the memory device is communicably coupled to the memory interface via a memory controller, the memory controller disposed within the housing proximate to the memory device, the memory controller communicably coupling the memory device to the memory interface.

In one or more of the disclosed embodiments, the fan module further includes: a fan interface disposed within the housing proximate to the front end; and a fan controller disposed within the housing proximate to the fan interface, the fan controller communicably coupled to the fan interface.

In one or more of the disclosed embodiments, the memory device is removably coupled to the fan module via the fan controller, the memory device communicably coupled to the fan controller.

In one or more of the disclosed embodiments, the memory device is removably coupled to the fan module via a side wall of the housing.

In one or more of the disclosed embodiments, the memory device is a solid-state drive (SSD) memory device.

In one or more of the disclosed embodiments, the memory interface is a serial advanced technology attachment (SATA) memory interface.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a network switch for an information handling system that includes: a central processing unit (CPU); and a fan module removably coupled to the network switch, the fan module including: a housing having a front end and a back end; a plurality of fans disposed within the housing proximate to the back end; a memory interface disposed within the housing proximate to the front end, the memory interface communicably coupled to the CPU; a memory device disposed within the housing proximate to the memory interface, the memory device storing information associated with the networking operations and communicably coupled to the memory interface, the memory device removably coupled to the fan module.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Figure 1:
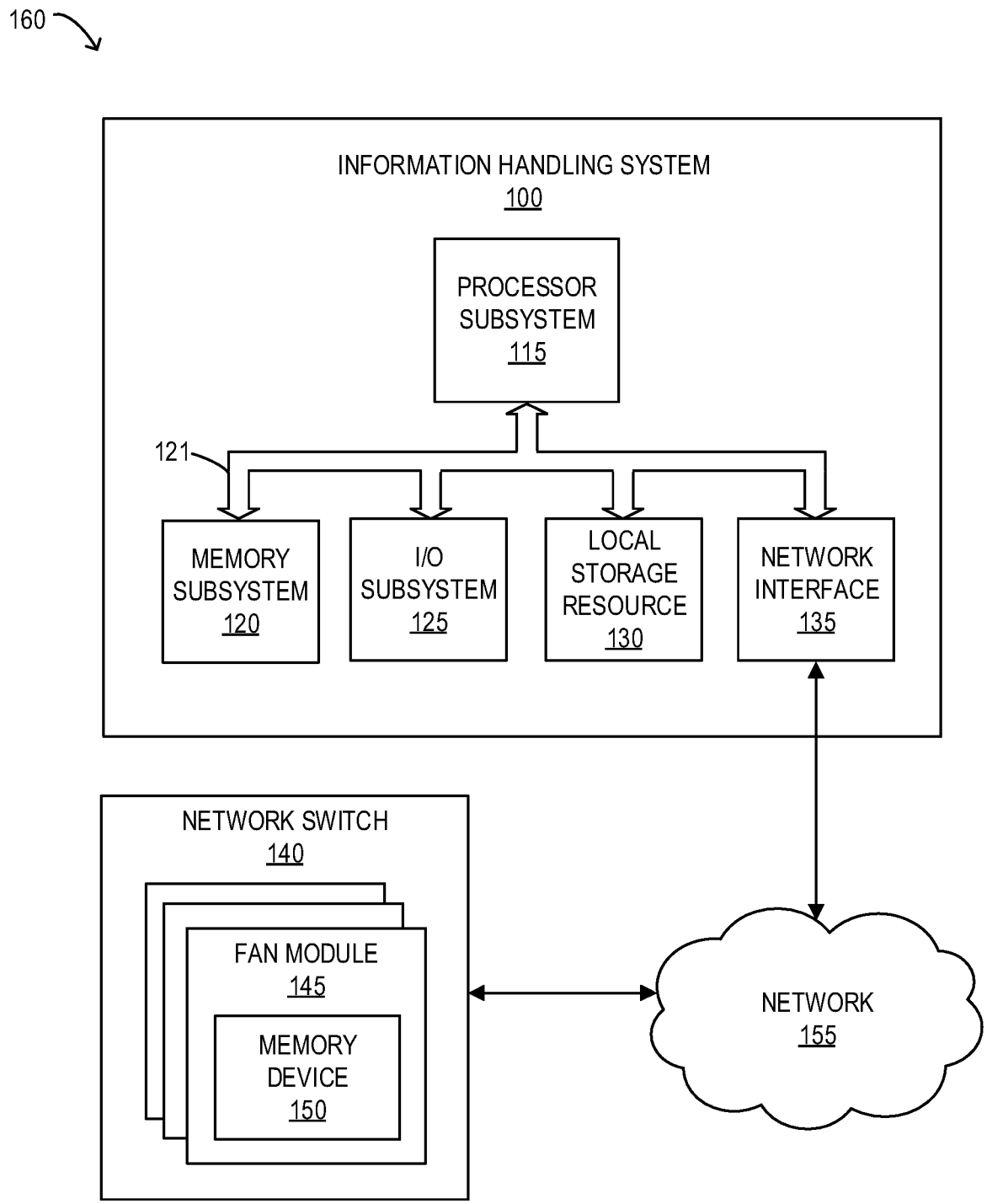
FIG. 1 is a block diagram of selected elements of an embodiment of a computing environment that includes an information handling system and a network switch.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 115, which may comprise one or more processors, and system bus 121 that communicatively couples various system components to processor subsystem 115 including, for example, a memory subsystem 120, an I/O subsystem 125, a local storage resource 130, and a network interface 135 communicably coupled to network switch 140 via network 155. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, HyperTransport (HT) bus, and Video Electronics Standards Association (VESA) local bus. It is noted that although one information handling system 100 is illustrated in the example computing environment 160 in FIG. 1, other embodiments may include any number of information handling systems 100. Similarly, in other embodiments, computing environment 160 may include additional, fewer, and/or different components than the components shown in FIG. 1.

In information handling system 100, processor subsystem 115 may comprise a system, device, or apparatus operable to interpret and/or execute program instructions and/or process data, and may include a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 115 may interpret and/or execute program instructions and/or process data stored locally (e.g., in memory subsystem 120 and/or another component of information handling system 100). In the same or alternative embodiments, processor subsystem 115 may interpret and/or execute program instructions and/or process data stored remotely. In one embodiment, processor subsystem 115 may be or include a multi-core processor comprised of one or more processing cores disposed upon an IC chip. In other embodiments, processor subsystem 115 may be or include an integrated device (e.g., microcontroller, system on a chip (SoC), and the like) that includes dedicated memory, peripheral interfaces, and/or other components suitable for interpreting and/or executing program instructions and/or processing data.

In one embodiment, memory subsystem 120 may comprise a system, device, or apparatus operable to retain and/or retrieve program instructions and/or data for a period of time (e.g., computer-readable media). Memory subsystem 120 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 125 may comprise a system, device, or apparatus generally operable to receive and/or transmit data to, from, and/or within information handling system 100. I/O subsystem 125 may represent, for example, a variety of communication interfaces, graphics interfaces, video interfaces, user input interfaces, and/or peripheral interfaces. In various embodiments, I/O subsystem 125 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 130 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 135 may be a suitable system, apparatus, or device operable to serve as an interface between information handling system 100 and a network 155. Network interface 135 may enable information handling system 100 to communicate over network 155 using a suitable transmission protocol and/or standard, including, but not limited to, transmission protocols and/or standards enumerated below with respect to the discussion of network 155. Network 155 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), a Cloud network, an Edge network, an intranet, the Internet or another appropriate architecture or system that facilitates the communication of signals, data and/or messages (generally referred to as data). Network interface 135 may enable wired and/or wireless communications (e.g., NFC or Bluetooth) to and/or from information handling system 100.

In particular embodiments, network 155 may include one or more routers for routing data between client information handling systems 100 and server information handling systems 100. A device (e.g., a client information handling system 100 or a server information handling system 100) on network 155 may be addressed by a corresponding network address including, for example, an Internet protocol (IP) address, an Internet name, a Windows Internet name service (WINS) name, a domain name or other system name. In particular embodiments, network 155 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

In computing environment 160, network switch 140 may comprise a system, device, or apparatus operable to communicably couple one or more information handling systems 100 via network 155. In particular, network switch 140 may be or include a networking hardware device operable to receive and forward data via network 155 (e.g., using packet switching) amongst one or more information handling systems 100 communicably coupled to network switch 140 via network 155. In the embodiment illustrated in FIG. 1, network switch 140 includes one or more fan modules 145 that may each include, or house, one or more memory devices 150. Conventionally, a network switch may house one or more memory devices (e.g., hard disk drive (HDD) memory devices, solid-state drive (SSD) memory devices, and the like) internally within a chassis of the network switch such that physical access to the one or more memory devices may be unavailable, or otherwise restricted, to a user. In particular, a user and/or administrator of computing environment 160 may be unable, or otherwise restricted due to manufacturer warranty, to physically access the one or more memory devices housed within a chassis of the conventional network switch for upgrade and/or maintenance. Further, the user and/or administrator may be unable, or otherwise restricted, to physically install additional memory devices within the network switch if network demands require additional storage. As such, conventional network switches may present users and/or administrators with a litany of challenges associated with upgrading memory devices, maintaining current memory devices, and/or replacing inoperable memory devices, thereby decreasing system efficiency and overall user experience.

In contrast, network switch 140 may include one or more fan modules 145 that may include, or house, one or more memory devices 150. Each fan module 145 may be removably coupled to network switch 140, allowing a user and/or administrator to physically remove fan module 145 from network switch 140. Similarly, each memory device 150 may be removably coupled to fan module 145, allowing the user and/or administrator to physically remove memory device 150, or memory devices 150, from fan module 145 (e.g., for upgrade, maintenance, replacement, and the like). Thus, memory devices 150 are made available to the user and/or administrator, thereby increasing system efficiency and overall user experience. Network switch 140 is described in greater detail with respect to FIG. 2.

In one embodiment, each fan module 145 (collectively referred to herein as "fan modules 145") may comprise a system, device, or apparatus operable to cause airflow within network switch 140. In particular, fan module 145 may be or include a hardware device used to house one or more fans (e.g., fans 200 shown in FIG. 2) and circuitry operable to cause the one or more fans to provide bidirectional airflow throughout the housing (e.g., housing 360 shown in FIGS. 3A-4B). In one embodiment, fan module 145 may be removably coupled to network switch 140 such that fan module 145 may be removed by a user and/or administrator of computing environment 160 as described above. In the embodiment illustrated in FIG. 1, fan module 145 may include one or more memory devices 150. Each memory device 150 housed within fan module 145 may be removably coupled to fan module 145 (e.g., via a side wall 350 shown in FIGS. 3A and 3B, via a fan controller 340 shown in FIGS. 4A and 4B, and the like) such that memory device 150 may be readily uninstalled from, and/or installed within, fan module 145. For example, memory device 150 may be uninstalled from fan module 145 by a user and/or administrator of computing environment 160 for upgrade or maintenance. Conversely, memory device 150, and/or additional memory devices 150, may be installed within fan module 145 by a user and/or administrator to provide network switch 140 with additional network storage capabilities. For example, a user and/or administrator may install multiple memory devices 150 comprising a redundant array of independent disks (RAID) within fan module 145 to increase network storage capabilities in response to increased networking demands within a business enterprise. Fan module 145 is described in greater detail with respect to FIGS. 2-4.

In one embodiment, each memory device 150 (collectively referred to herein as "memory devices 150") may comprise a system, device, or apparatus operable to retain and/or retrieve program instructions and/or data for a period of time (e.g., computer-readable media). As described above, each memory device 150 housed within fan module 145 may be removably coupled to fan module 145 (e.g., via a side wall 350 shown in FIGS. 3A and 3B, via a fan controller 340 shown in FIGS. 4A and 4B, and the like) such that memory device 150 may be readily uninstalled from, and/or installed within, fan module 145. In one embodiment, memory device 150 may be or include an SSD (e.g., SATA, NVMe, M.2, and the like) memory device. In this embodiment, memory device 150 may be or include an SSD memory device operable for storing information associated with networking operations. For example, memory device 150 may store one or more debug logs, one or more containers used by one or more operations systems of network switch 140, and the like. Here, memory device 150 may be uninstalled from a fan module 145 of one network switch and installed within a fan module 145 of a different network switch, thereby transferring, or otherwise migrating, the information associated with network operations stored therein to a different network switch within computing environment 160. In another embodiment, memory device 150 may be or include an HDD memory device. In other embodiments, memory device 150 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to network switch 140 (and/or fan module 145) is powered down. Memory device 150 is described in further detail with respect to FIGS. 2-4.

Figure 2:
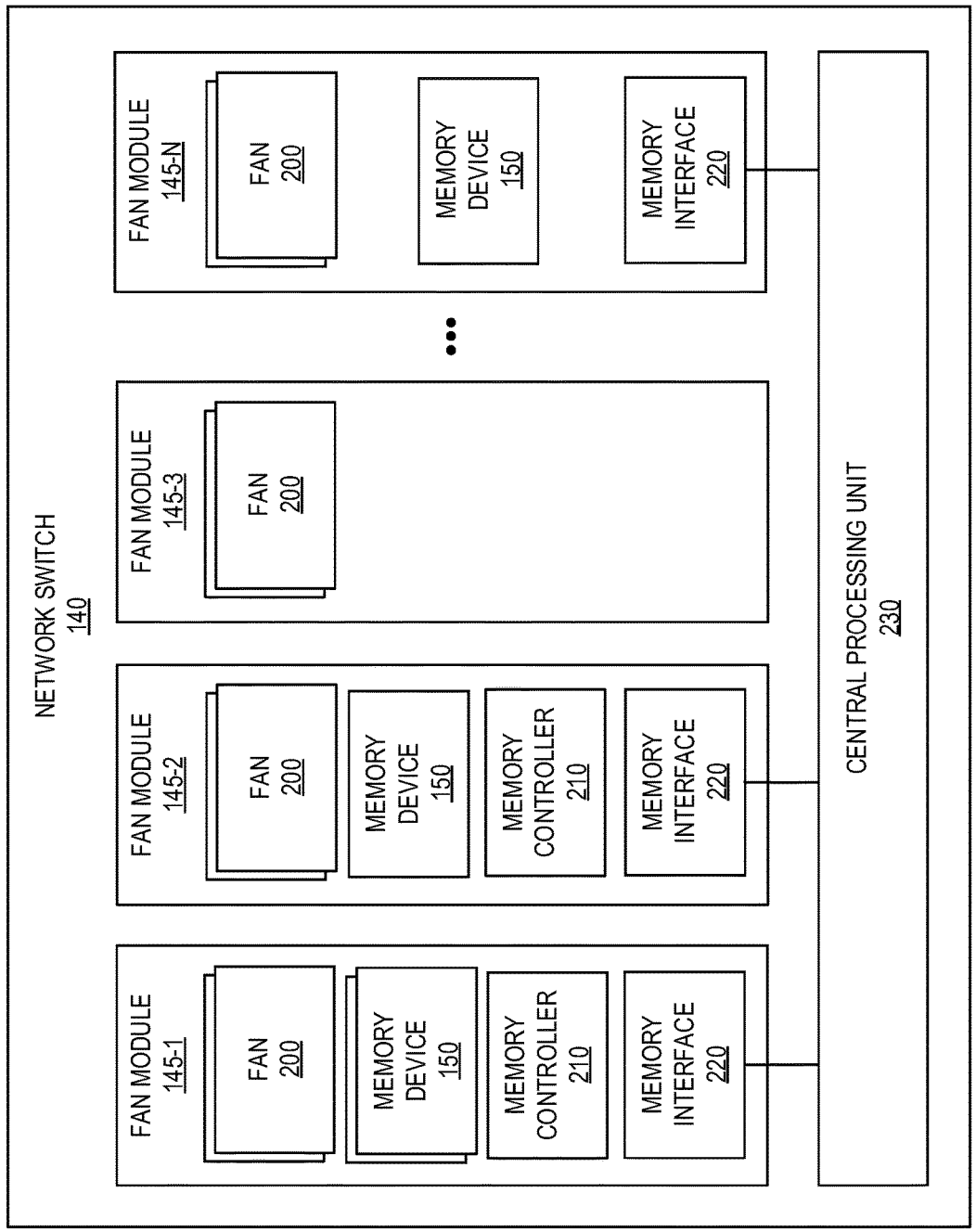
FIG. 2 illustrates selected elements of an embodiment of a network switch.

FIG. 2 illustrates selected elements of an embodiment of a network switch. As described above with respect to FIG. 1, network switch 140 may be or include a networking hardware device operable to communicably couple one or more information handling systems 100 via network 155. In the embodiment illustrated in FIG. 2, network switch 140 includes fan modules 145-1 through 145-N communicably coupled to a central processing unit (CPU) 230 via a motherboard, or switch board, (not shown in figure) of network switch 140. Fan modules 145 include one or more fans (e.g., fans 200), one or more memory devices 150, a memory controller 210, and a memory interface 220 communicably coupled to CPU 230 (via a motherboard). Memory devices 150 shown in fan module 145-1 of FIG. 2 may be or include a RAID. It is noted that in the embodiment illustrated in FIG. 2, one or more components (e.g., motherboard, baseboard management controller (BMC), light-emitting diodes (LEDs), optical modules, fan controllers, fan interfaces, various connections from fan modules 145-1 through 145-N to CPU 230, screws/fasteners, and the like) have been omitted for clarity, and/or illustrative purposes. Other embodiments of network switch 140 may include additional, fewer, and/or different components than the components shown in FIG. 2.

In one embodiment, each fan 200 (collectively referred to herein as "fans 200") may comprise a system, device, or apparatus operable to cause airflow within fan module 145. In particular, each fan 200 may be or include a hardware device operable to direct a surrounding airflow across one or more devices (e.g., CPU 230) of network switch 140 to cause ambient heat within a housing of network switch 140 to exit the housing (e.g., via one or more vents of network switch 140). In one embodiment, the surrounding airflow directed by fan 200 may be bidirectional (e.g., surrounding airflow 310 shown in FIGS. 3A-4B). For example, fan 200 may rotate in a clockwise direction to direct an airflow comprised of cool air—external to network switch 140—into the housing and across one or more devices. In another example, fan 200 may rotate in a counterclockwise direction to expel warm ambient air from the housing of network switch 140 via one or more vents. In one embodiment, fan 200 may be or include an axial fan comprised of an assembly, or arrangement, of vanes or blades operable to rotate about a hub or rotor. In another embodiment, fan 200 may be or include a centrifugal fan that includes a ducted housing to direct outgoing airflow across one or more devices of network switch 140. In other embodiments, fan 200 may be or include a propeller fan, tubeaxial fan, vaneaxial fan, and/or any other type of fan suitable for directing a surrounding air flow across one or more devices of network switch 140.

In one embodiment, memory controller 210 may comprise a system, device, or apparatus operable to communicably couple one or more components within fan module 145. In particular, memory controller 210 may be or include an electronic hardware device (e.g., microcontroller, integrated circuit (IC) chip, and the like) operable to communicably couple memory device 150 to memory interface 220 such that memory device 150 may be accessed (e.g., by CPU 230) via memory interface 220. In one embodiment, memory controller 210 may include one or more dedicated memory storage devices (not shown in figure) operable to store information associated with memory devices 150. For example, one or more dedicated memory storage devices included in memory controller 210 may store information describing a vendor and/or manufacturer of memory device 150, a geometry associated with memory device 150, a storage capacity of memory device 150, and the like.

In one embodiment, CPU 230 may access memory controller 210 (via memory interface 220) to retrieve information describing memory devices 150 within a fan module 145 (e.g., during a booting process). For example, CPU 230 may access memory controllers 210 within fan modules 145-1 and 145-2 during a booting process of network switch 140 to retrieve information describing memory devices 150 such that CPU 230 may identify, or otherwise enumerate, memory devices 150 available for performing networking operations within network switch 140. In another example, network switch 140 may include basic input/output system (BIOS) firmware operable to access memory controllers 210 within fan modules 145-1 and 145-2 during a pre-boot process of network switch 140 to retrieve information describing memory devices 150 while executing a diagnostic testing sequence (e.g., a power-on self-test (POST)). In yet another example, an operating system (OS) of network switch 140 may access memory controllers 210 within fan modules 145-1 and 145-2 to retrieve information describing memory devices 150 such that the OS may mount memory devices 150 for performing networking operations.

In one embodiment, fan module 145 may not include memory controller 210. This is shown in FIG. 2 where fan module 145-N in network switch 140 includes a memory device 150 and a memory interface 220 but does not include a memory controller 210. Here, for example, memory device 150 may be communicably coupled to memory interface 220 directly such that information describing memory device 150 may be stored in memory device 150 and accessed (e.g., by CPU 230) via memory interface 220. For example, CPU 230 may access memory device 150 within fan module 145-N during a booting process of network switch 140 to retrieve information describing memory device 150 such that CPU 230 may identify, or otherwise enumerate, memory device 150 for performing networking operations within network switch 140. In another example, network switch 140 may include BIOS firmware operable to access memory device 150 within fan module 145-N during a pre-boot process of network switch 140 to retrieve information describing memory device 150 while executing a diagnostic testing sequence. In yet another example, an OS of network switch 140 may access memory device 150 within fan module 145-N to retrieve information describing memory device 150 such that the OS may mount memory device 150 for performing networking operations.

In one embodiment, memory interface 220 may comprise a system, device, or apparatus operable to communicably couple one or more components of fan module 145 to one or more components of network switch 140. In particular, memory interface 220 may be or include an electronic interface, or port, operable to communicably couple one or more components of network switch 140 (e.g., CPU 230 via a motherboard) to one or more memory devices 150 housed within fan module 145. For example, CPU 230 may access memory devices 150 and/or memory controller 210 housed in fan module 145-1 shown in FIG. 1 via memory interface 220 such that CPU 230 may identify, or otherwise enumerate, memory device 150 for performing networking operations within network switch 140. In one embodiment, memory interface 220 may be or include a serial advanced technology attachment (SATA) memory interface. In other embodiments, memory interface 220 may be or include a parallel ATA (PATA) memory interface, a small computer system interface (SCSI), a serial attached SCSI (SAS), a fibre channel, and/or any other type of memory interface suitable for communicably coupling one or more components of fan module 145 to one or more components of network switch 140. Memory interface 220 is described in further detail with respect to FIGS. 3A-4B.

In one embodiment, CPU 230 may comprise a system, device, or apparatus operable to interpret and/or execute program instructions and/or process data. In particular, CPU 230 may be or include an electronic hardware device including circuitry configured to interpret and/or execute program instructions and/or process data. In some embodiments, CPU 230 may interpret and/or execute program instructions and/or process data stored locally (e.g., in memory devices 150, one or more memory storage devices disposed on motherboard of network switch 140, and the like). In the same or alternative embodiments, CPU 230 may interpret and/or execute program instructions and/or process data stored remotely (e.g., in memory subsystem 120 and/or local storage resource 130 of information handling system 100). In the embodiment illustrated in FIG. 2, CPU 230 may be disposed upon, and/or communicably coupled to, a motherboard of network switch 140. CPU 230 may access memory devices 150 and/or memory controllers 210 housed in fan modules 145 (e.g., fan modules 145-1 and 145-2) of network switch 140 via memory interface 220. For example, CPU 230 may access memory device 150 within fan module 145-N via memory interface 220 during a booting process of network switch 140 to retrieve information describing memory device 150 such that CPU 230 may identify, or otherwise enumerate, memory device 150 for performing networking operations within network switch 140. In one embodiment, CPU 230 may be or include a multi-core processor comprised of one or more processing cores disposed upon an IC chip. In another embodiment, CPU 230 may be or include a single-core processor. CPU 230 is described in further detail with respect to FIGS. 3A-4B.

Figure 3A:
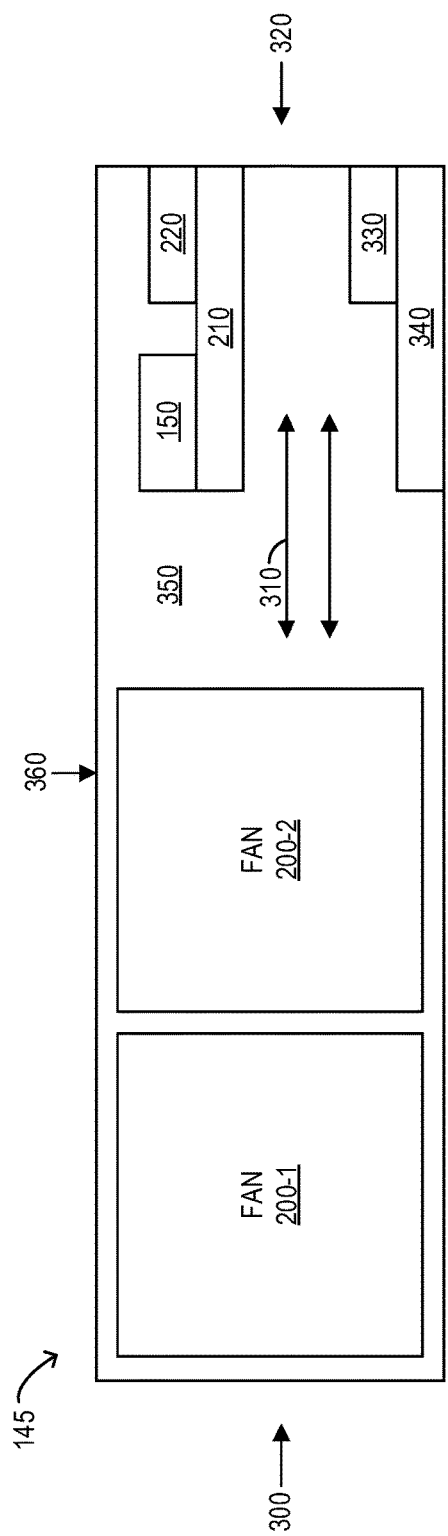
FIGS. 3A and 3B illustrate selected elements of an embodiment of a housing for a fan module that includes a memory device, a memory controller, and a memory interface.
Figure 3B:
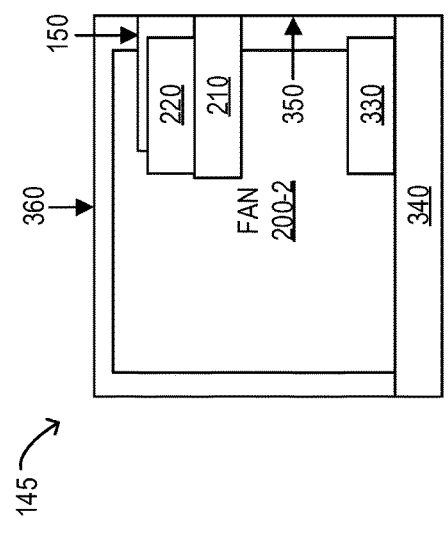

FIGS. 3A and 3B illustrate selected elements of an embodiment of a housing for a fan module that includes a memory device, a memory controller, and a memory interface. FIG. 3A illustrates an example side view of housing 360 for fan module 145. FIG. 3B illustrates an example front view of housing 360 for fan module 145. As shown in FIG. 3A, housing 360 includes front end 320 and back end 300. Housing 360 may be or include a rigid material (e.g., metal, steel, and the like) operable to provide a protective enclosure for fans 200-1 and 200-2 (collectively referred to herein as "fans 200"), memory device 150, memory controller 210, and memory interface 220 as described above with respect to FIG. 2. Additionally, housing 360 includes fan interface 330 and fan controller 340. In the embodiment illustrated in FIGS. 3A and 3B, memory device 150 and memory controller 210 may be removably coupled to side wall 350 of housing 360 allowing surrounding airflow 310 (e.g., caused by fans 200) to traverse bidirectionally throughout housing 360. For example, memory device 150 and memory controller 210 may be removably coupled to side wall 350 of housing 360 using one or more screws, mechanical fasteners, angle brackets, and the like. In other embodiments, fan module 145 may include additional, fewer, and/or different components than the components shown in FIGS. 3A and 3B.

In one embodiment, fan controller 340 may comprise a system, device, or apparatus operable to communicably couple one or more components within fan module 145. Specifically, fan controller 340 may be or include an electronic hardware device (e.g., microcontroller, IC chip, and the like) operable to communicably couple fans 200 to fan interface 330 such that fans 200 may be accessed (e.g., by a BMC of network switch 140) via fan interface 330. In one embodiment, fan controller 340 may include one or more dedicated memory storage devices (not shown in figure) operable to store information associated with fans 200. For example, one or more dedicated memory storage devices included in fan controller 340 may store information describing a vendor and/or manufacturer of fans 200, a geometry associated with fans 200, a fan speed of fans 200, and the like. In one embodiment, a BMC (not shown in figure) of network switch 140 may access fan controller 340 (via fan interface 330) to retrieve and/or modify information describing fans 200 within a fan module 145 (e.g., during an operation of network switch 140). For example, network switch 140 may include a BMC communicably coupled to fan controller 340 and/or fans 200 such that the BMC may provide pulse width modulation (PWM) and/or LED driver signals to fan controller 340 via fan interface 330. In one embodiment, the BMC may communicate with fan controller 340 (i.e., one or more dedicated processors therein) via fan interface 330 using an inter-integrated circuit (I2C) protocol.

As shown in the embodiment illustrated in FIGS. 3A and 3B, fans 200 may be disposed proximate to back end 300 of housing 360, allowing fans 200 to direct an airflow comprised of cool air—external to network switch 140—into housing 360 and/or expel warm ambient air from housing 360 via one or more vents. Memory interface 220 may be disposed within housing 360 opposite fans 200 proximate to front end 320, allowing memory interface 220 to communicably couple to CPU 230. Memory device 150 may be disposed within housing 360 proximate to memory interface 220, removably coupled to side wall 350. As described above with respect to FIG. 1, memory device 150 may be removably coupled to fan module 145 (e.g., via side wall 350) such that memory device 150 may be readily uninstalled from, and/or installed within, fan module 145. For example, memory device 150 may be uninstalled from fan module 145 by a user and/or administrator of computing environment 160 for upgrade or maintenance. In the embodiment illustrated in FIGS. 3A and 3B, memory device 150 may be communicably coupled to memory interface 220 via memory controller 210. Memory controller 210 may be disposed within housing 360 proximate to memory device 150 such that memory controller 210 may communicably couple memory device 150 to memory interface 220. Below memory device 150, memory controller 210, and memory interface 220 shown in FIGS. 3A and 3B, fan interface 330 may be disposed within housing 360 proximate to front end 320, allowing fan interface 330 to communicably couple to BMC as described above. Fan controller 340 may be disposed within housing 360 proximate to fan interface 330 allowing fan controller 340 to communicably couple to fan interface 330.

Figure 4A:
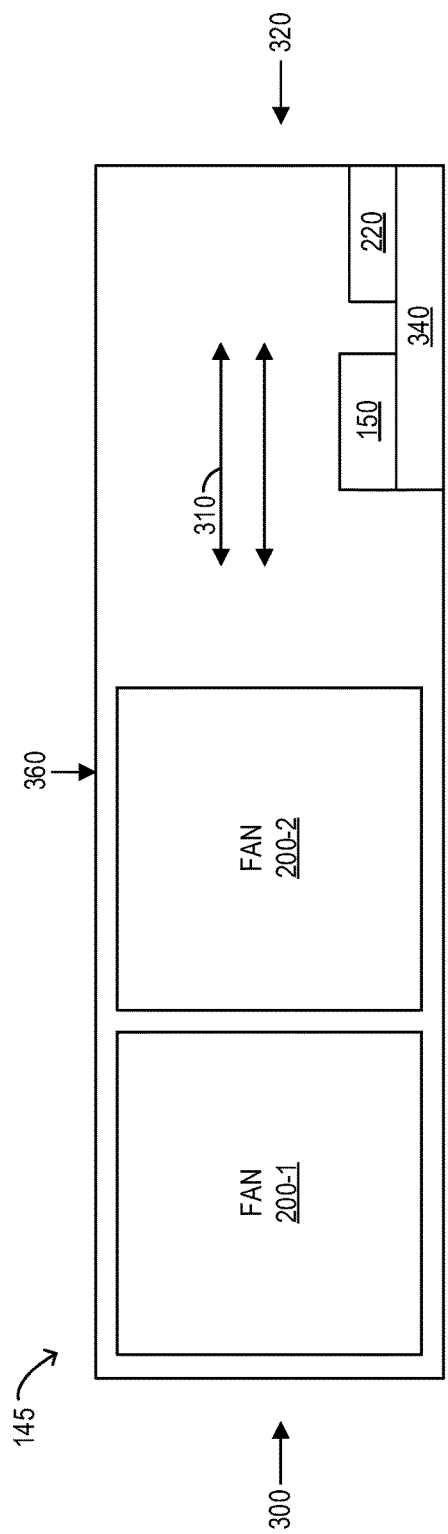
FIGS. 4A and 4B illustrate selected elements of an embodiment of a housing for a fan module that includes a memory device and a memory interface.
Figure 4B:
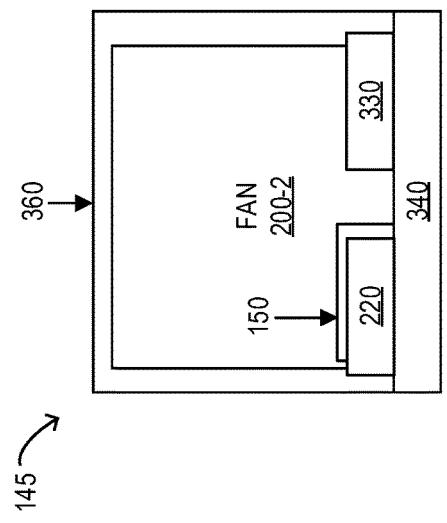

FIGS. 4A and 4B illustrate selected elements of an embodiment of a housing for a fan module that includes a memory device and a memory interface. FIG. 4A illustrates an example side view of housing 360 for fan module 145. FIG. 4B illustrates an example front view of housing 360 for fan module 145. As shown in FIG. 4A, housing 360 includes front end 320 and back end 300. Housing 360 may be or include a rigid material (e.g., metal, steel, and the like) operable to provide a protective enclosure for fans 200, memory device 150, and memory interface 220 as described above with respect to FIG. 2. Additionally, housing 360 includes fan interface 330 and fan controller 340 described above with respect to FIGS. 3A and 3B. In the embodiment illustrated in FIGS. 4A and 4B, memory device 150 may be communicably coupled to fan controller 340 within housing 360 allowing surrounding airflow 310 (e.g., caused by fans 200) to traverse bidirectionally throughout housing 360. For example, memory device 150 may be communicably coupled to fan controller 340 via one or more ports of fan controller 340. In other embodiments, fan module 145 may include additional, fewer, and/or different components than the components shown in FIGS. 4A and 4B.

As shown in the embodiment illustrated in FIGS. 4A and 4B, fans 200 may be disposed proximate to back end 300 of housing 360, allowing fans 200 to direct an airflow comprised of cool air—external to network switch 140—into housing 360 and/or expel warm ambient air from housing 360 via one or more vents. Memory interface 220 may be disposed within housing 360 opposite fans 200 proximate to front end 320, allowing memory interface 220 to communicably couple to CPU 230. Memory device 150 may be disposed within housing 360 proximate to memory interface 220, communicably coupled to fan controller 340. As described above with respect to FIG. 1, memory device 150 may be removably coupled to fan module 145 (e.g., via fan controller 340) such that memory device 150 may be readily uninstalled from, and/or installed within, fan module 145. For example, a user and/or administrator may install multiple memory devices 150 comprising a RAID within fan module 145 to increase network storage capabilities in response to increased networking demands within a business enterprise. In the embodiment illustrated in FIGS. 4A and 4B, memory device 150 may be communicably coupled to memory interface 220 via fan controller 340. Proximate to memory interface 220, fan interface 330 may be disposed within housing 360 proximate to front end 320, allowing fan interface 330 to communicably couple to BMC as described above. Fan controller 340 may be disposed within housing 360 proximate to fan interface 330 allowing fan controller 340 to communicably couple to fan interface 330. In one embodiment, memory interface 220 and fan interface 330 may be consolidated, or otherwise partitioned, into a single interface disposed proximate to front end 320 to communicably couple, both, memory device 150 to CPU 230 and fan controller 340 to BMC, respectively.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computing environment, comprising:
   a network;
   an information handling system;
   a network switch communicably coupled to the information handling system via the network, the network switch including:
      a central processing unit (CPU); and
      a fan module removably coupled to the network switch, the fan module including:
         a housing having a front end and a back end;
         a plurality of fans disposed within the housing proximate to the back end;
         a memory interface disposed within the housing proximate to the front end, the memory interface communicably coupled to the CPU; and
         a memory device disposed within the housing proximate to the memory interface, the memory device storing information associated with the networking operations and communicably coupled to the memory interface, the memory device removably coupled to the fan module.

2. The computing environment of claim 1, wherein the memory device is communicably coupled to the memory interface via a memory controller, the memory controller disposed within the housing proximate to the memory device, the memory controller communicably coupling the memory device to the memory interface.

3. The computing environment of claim 1, wherein the fan module further includes:
   a fan interface disposed within the housing proximate to the front end; and a fan controller disposed within the housing proximate to the fan interface, the fan controller communicably coupled to the fan interface.

4. The computing environment of claim 3, wherein the memory device is removably coupled to the fan module via the fan controller, the memory device communicably coupled to the fan controller.

5. The computing environment of claim 1, wherein the memory device is removably coupled to the fan module via a side wall of the housing.

6. The computing environment of claim 1, wherein the memory device is a solid-state drive (SSD) memory device.

7. The computing environment of claim 1, wherein the memory interface is a serial advanced technology attachment (SATA) memory interface.

8. A network switch for an information handling system, comprising:
   a central processing unit (CPU); and
   a fan module removably coupled to the network switch, the fan module including:
      a housing having a front end and a back end;
      a plurality of fans disposed within the housing proximate to the back end;
      a memory interface disposed within the housing proximate to the front end, the memory interface communicably coupled to the CPU; and
      a memory device disposed within the housing proximate to the memory interface, the memory device storing information associated with the networking operations and communicably coupled to the memory interface, the memory device removably coupled to the fan module.

9. The network switch of claim 8, wherein the memory device is communicably coupled to the memory interface via a memory controller, the memory controller disposed within the housing proximate to the memory device, the memory controller communicably coupling the memory device to the memory interface.

10. The network switch of claim 8, wherein the fan module further includes:
    a fan interface disposed within the housing proximate to the front end; and
    a fan controller disposed within the housing proximate to the fan interface, the fan controller communicably coupled to the fan interface.

11. The network switch of claim 10, wherein the memory device is removably coupled to the fan module via the fan controller, the memory device communicably coupled to the fan controller.

12. The network switch of claim 8, wherein the memory device is removably coupled to the fan module via a side wall of the housing.

13. The network switch of claim 8, wherein the memory device is a solid-state drive (SSD) memory device.

14. The network switch of claim 8, wherein the memory interface is a serial advanced technology attachment (SATA) memory interface.

* * * * *